(12) United States Patent
Inoue

(10) Patent No.: US 11,134,490 B2
(45) Date of Patent: Sep. 28, 2021

(54) ELECTRONIC APPARATUS

(71) Applicant: Seiko Epson Corporation, Tokyo (JP)

(72) Inventor: Katsutoyo Inoue, Azumino (JP)

(73) Assignee: Seiko Epson Corporation

( * ) Notice: Subject to any disclaimer, the term of this patent is extended or adjusted under 35 U.S.C. 154(b) by 120 days.

(21) Appl. No.: 16/695,762

(22) Filed: Nov. 26, 2019

(65) Prior Publication Data
US 2020/0170015 A1 May 28, 2020

(30) Foreign Application Priority Data

Nov. 27, 2018 (JP) .............................. JP2018-220932

(51) Int. Cl.
| | | |
|---|---|---|
| *H04W 72/04* | (2009.01) | |
| *H04B 1/48* | (2006.01) | |
| *H04B 1/50* | (2006.01) | |

(52) U.S. Cl.
CPC .......... *H04W 72/0453* (2013.01); *H04B 1/48* (2013.01); *H04B 1/50* (2013.01)

(58) Field of Classification Search
CPC ............................ H04W 72/0453; H04B 1/48
See application file for complete search history.

(56) References Cited

U.S. PATENT DOCUMENTS

| | | | | |
|---|---|---|---|---|
| 2002/0177441 | A1 | 11/2002 | Ida et al. | |
| 2005/0085214 | A1* | 4/2005 | Laroia | H04L 5/0048 455/403 |
| 2012/0057620 | A1* | 3/2012 | Yamamoto | H04W 48/10 375/211 |
| 2014/0228028 | A1* | 8/2014 | Cheng | H04N 21/42676 455/436 |

FOREIGN PATENT DOCUMENTS

| | | |
|---|---|---|
| JP | 2002-354532 A | 12/2002 |
| JP | 2018-014591 A | 1/2018 |

OTHER PUBLICATIONS

LoRa Alliance Technical Committee, "LoRaWAN™ 1.1 Specification", LoRa Alliance, Inc., Version 1.1, Oct. 11, 2017, pp. 1-101.
LoRa Alliance Technical Committee, "LoRaWAN™ 1.1 Regional Parameters", LoRa Alliance, Inc., Oct. 11, 2017, pp. 1-56.

* cited by examiner

*Primary Examiner* — Zhiren Qin
(74) *Attorney, Agent, or Firm* — Harness, Dickey & Pierce, P.L.C.

(57) ABSTRACT

An electronic apparatus includes a communication interface configured to selectively receive a first signal having a first carrier frequency transmitted for a first period by a first transmitter, and a second signal having a second carrier frequency different from the first carrier frequency and transmitted for a second period not continuous with the first period by a second transmitter different from the first transmitter, and a control circuit configured to cause the communication interface to execute the first signal for a third period including the first period and to, when the communication interface does not receive the first signal during the third period, cause the communication interface to execute reception processing of the second signal for a fourth period including the second period and being not continuous with the third period.

8 Claims, 7 Drawing Sheets

| BASE STATION INFORMATION | POSITION INFORMATION |
|---|---|
| 12-AB-3A-F0-48-9E | (N35.68, E139.78) |
| 54-2C-EF-05-11-45 | (N34.70, E135.49) |
| 22-24-D3-46-3A-B2 | (N33.59, E130.42) |
| . . . | . . . |
| . . . | . . . |

| REGION | FREQUENCY (MHz) | ADJACENT REGION | OTHER PARAMETERS |
|---|---|---|---|
| A | 869.525 | B, D, J | ... |
| B | 923.3 | A, D, J | ... |
| C | 786 | D, F, H, I, J | ... |
| D | ... | ... | ... |
| ... | ... | ... | ... |
| ... | ... | ... | ... |

FIG. 6

| AREA | AREA INFORMATION (LATITUDE, LONGITUDE) | TIME DIFFERENCE INFORMATION |
|---|---|---|
| a | (N39,E124), (N31,E146) | +9 |
| b | (N49,E108), (N21,E124) | +8 |
| c | (N21,E93), (N6,E108) | +7 |
| d | ... | ... |
| ... | ... | ... |

FIG. 7

ELECTRONIC APPARATUS

The present application is based on, and claims priority from, JP Application Serial Number 2018-220932, filed Nov. 27, 2018, the disclosure of which is hereby incorporated by reference herein in its entirety.

BACKGROUND

1. Technical Field

The present disclosure relates to an electronic apparatus.

2. Related Art

JP-A-2018-14591 discloses use of a sub-gigahertz band communication scheme, such as a LoRa (registered trademark) scheme, for wireless communication between a first device and a second device. JP-A-2002-354532 discloses a technology for searching frequencies determined by a predetermined standard for a frequency to be used in a communication method that uses a different frequency for each region.

Nevertheless, when a search is conducted for a frequency using the technology described in JP-A-2002-354532, the possibility exists that power consumption may become excessive for a small electronic apparatus having a constrained configuration, such as a watch, for example.

SUMMARY

An electronic apparatus according to an aspect of the present disclosure includes a communication interface configured to selectively receive a first signal having a first carrier frequency transmitted for a first period by a first transmitter, and a second signal having a second carrier frequency different from the first carrier frequency and transmitted for a second period not continuous with the first period by a second transmitter different from the first transmitter, a timekeeping circuit configured to keep an internal time, and a control circuit configured to cause the communication interface to execute reception processing of the first signal for a third period, including the first period, of the internal time and to, when the communication interface does not receive the first signal during the third period, cause the communication interface to execute reception processing of the second signal for a fourth period, including the second period and being not continuous with the third period, of the internal time.

The electronic apparatus described above may further include a storage device configured to store a frequency table indicating that the first carrier frequency and the second carrier frequency are respectively used in regions adjacent to each other. The control circuit may be configured to cause the communication interface to execute reception processing of the second signal following the first signal with reference to the frequency table.

In the electronic apparatus described above, the control circuit may be configured to, at startup, extend the third period as an initial operation.

The electronic apparatus described above may further include a secondary battery and a power supply for charging configured to supply power to the secondary battery. In such a configuration, the control circuit may be configured to cause the communication interface to execute reception processing of the first signal in a predetermined cycle, and extend the predetermined cycle when a duration time in which power is not supplied from the power supply for charging to the secondary battery exceeds a threshold value.

In the electronic apparatus described above, the communication interface may comply with any one of LoRaWAN, SIGFOX, NB-IoT, and Wi-Fi HaLow.

In the electronic apparatus described above, each of the first carrier frequency and the second carrier frequency may be within a range of a sub-gigahertz band.

In the electronic apparatus described above, the communication interface may be configured to transmit, when the communication interface receives the first signal during the third period, a first request signal having a third carrier frequency determined from the first carrier frequency to the first transmitter, and transmit, when the second signal is received during the fourth period, a second request signal having a fourth carrier frequency determined from the second carrier frequency to the second transmitter.

In the electronic apparatus described above, the control circuit may be configured to correct the internal time based on first time information when the communication interface receives the first time information as a response to the first request signal, and correct the internal time based on the second time information when the communication interface receives the second time information as a response to the second request signal.

BRIEF DESCRIPTION OF THE DRAWINGS

FIG. 6 is a table for explaining an example of a frequency table.

FIG. 7 is a table for explaining an example of a time zone table.

DESCRIPTION OF EXEMPLARY EMBODIMENTS

Figure 1:
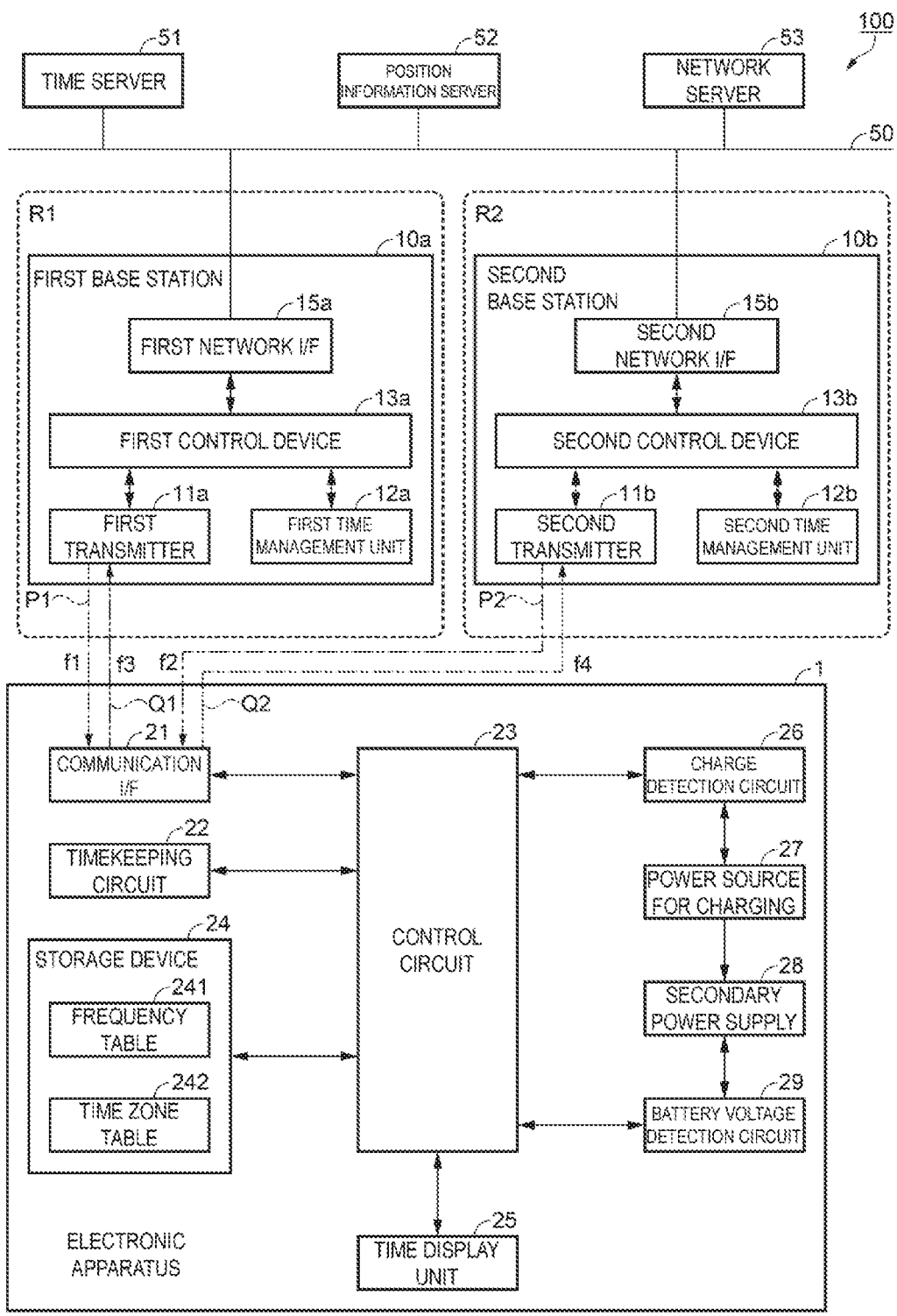
FIG. 1 is a block diagram for explaining an example of a frequency search system including an electronic apparatus according to an exemplary embodiment.

An electronic apparatus according to an exemplary embodiment of the present disclosure will be described below with reference to the accompanying drawings. Note that the exemplary embodiments described hereinafter are not intended to limit the content of the present disclosure as set forth in scope of the claims. All of the configurations described in the exemplary embodiments are not necessarily essential constituent requirements of the present disclosure. Additionally, identical or similar elements in the drawings are given the same or similar symbols, respectively, and redundant descriptions thereof will be omitted.

Frequency Search System

As illustrated in FIG. 1, an electronic apparatus 1 according to an embodiment of the present disclosure includes a first base station 10a positioned in a first region R1, a second base station 10b positioned in a second region R2 different from the first region R1, and a frequency search system 100. For example, each of the first region R1 and the second region R2 is a region such as Europe, the United States, China, and Asia in which a frequency band used for specific wireless communication is defined as a standard. A plurality of base stations similar to each other may be disposed in one region. The frequency search system 100 is a system for searching for a frequency used in the region where the electronic apparatus 1 is present.

The first base station 10a is a base station including, for example, a first transmitter 11a, a first time management unit 12a, a first control device 13a, and a first network interface (I/F) 15a. The first transmitter 11a transmits a first signal P1 to a device present in the first region R1. The first signal P1 is a radio wave having a first carrier frequency f1. The first carrier frequency f1 is a frequency included in a first frequency band in which use in the first region R1 is defined as standard. The first transmitter 11a may not only transmit but also receive radio waves. That is, the first transmitter 11a can perform wireless communication with an external device. The first time management unit 12a is a circuit for managing a first time synchronized with a standard time such as Coordinated Universal Time (UTC), for example.

The first network I/F 15a is connected to a time server 51 via a network 50 and a network server 53. The network 50 is a communication line such as the Internet, for example. The network server 53 has a role of relaying various services that exist on the network 50 with the first base station 10a and the second base station 10b. The time server 51 is a server, such as a Network Time Protocol (NTP) server, that distributes time information including a standard time. For example, the first network I/F 15a transmits a query to the time server 51 via the network 50 and the network server 53, and receives time information from the time server 51 via the network 50 and the network server 53.

The first control device 13a includes a processing circuit such as a central processing unit (CPU), for example. The first control device 13a controls the operation of the first transmitter 11a, the first time management unit 12a, and the first network I/F 15a. For example, the first control device 13a controls the first network I/F 15a to obtain time information at a predetermined timing. The first control device 13a outputs time information including the obtained standard time to the first time management unit 12a. The first time management unit 12a synchronizes the first time to be kept with the standard time included in the time information obtained from the time server 51.

Figure 2:
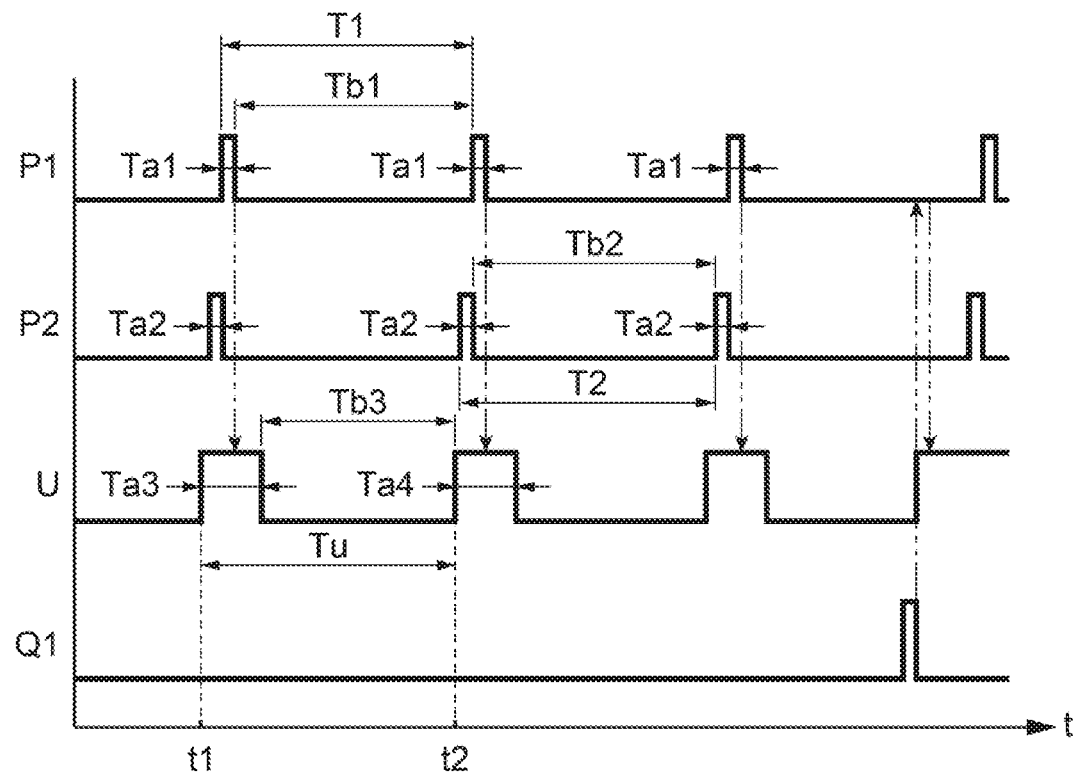
FIG. 2 is a timing chart for explaining an example of a temporal relationship of a first signal, a second signal, and a reception control signal.

As illustrated in FIG. 2, the first signal P1 is continuously transmitted in a first period Ta1, and the transmission is continuously stopped in a first interval Tb1. That is, the first transmitter 11a cyclically and intermittently outputs the first signal P1 with a sum of the first period Ta1 and the first interval Tb1 as a cycle T1, in accordance with the control by the first control device 13a. The first period Ta1 and the first interval Tb1 are defined, for example, at a first time, i.e., a standard time, kept by the first time management unit 12a.

As illustrated in FIG. 1, the second base station 10b, similar to the first base station 10a, is a base station including a second transmitter 11b, a second time management unit 12b, a second control device 13b, and a second network interface (I/F) 15b. The second transmitter 11b transmits a second signal P2 to a device present in the second region R2. The second signal P2 is a radio wave having a second carrier frequency f2 different from the first carrier frequency f1. The second carrier frequency f2 is a frequency included in a second frequency band in which use in the second region R2 is defined as standard. In addition, the second transmitter 11b may perform wireless communication with an external device by receiving radio waves. The second time management unit 12b is a circuit for managing a second time synchronized with a standard time.

The second control device 13b includes a processing circuit such as a CPU, for example. The second control device 13b controls the operation of the second transmitter 11b, the second time management unit 12b, and the second network I/F 15b. For example, the second control device 13b controls the second network I/F 15b to obtain time information from the time server at a predetermined timing. The second control device 13b outputs time information including the obtained standard time to the second time management unit 12b. The second time management unit 12b synchronizes the second time to be kept with the standard time included in the time information obtained from the time server 51.

As illustrated in FIG. 2, the second signal P2 is continuously transmitted in a second period Ta2, and the transmission is continuously stopped in a second interval Tb2. That is, the second base station 10b cyclically and intermittently transmits the second signal P2 with a sum of the second period Ta2 and the second interval Tb2 as a cycle T2, in accordance with the control by the second control device 13b. The second period Ta2 and the second interval Tb2 are defined, for example, at a second time, i.e., a standard time, that is kept by the second time management unit 12b. The second period Ta2 matches the first period Ta1. However, the internal time of the first transmitter and the internal time of the second transmitter may deviate due to a difference in network paths with the time server 51. In this case, a start timing of the first period Ta1 and a start timing of the second period Ta2 may deviate as illustrated in FIG. 2.

Here, a length of the second period Ta2 is equal to a length of the first period Ta1. Then, the cycle T1 of the first signal P1 and the cycle T2 of the second signal P2 are equal. Thus, the second interval Tb2 matches the first interval Tb1. Each of cycles T1 and T2 may be, for example, five minutes. In this case, the first base station 10a and the second base station 10b may transmit the first signal P1 and the second signal P2 every five minutes, for example, starting from zero minutes in standard time.

Any communication standard in the communication standard group called Low Power Wide Area (LPWA) may be employed as the wireless communication standard of the frequency search system 100. In other words, any of LoRaWAN, SIGFOX (registered trademark), Wi-Fi HaLow, or the like can be used as the wireless communication standard. The first frequency band including the first carrier frequency f1 and the second frequency band including the second carrier frequency f2 may each be within a range of a sub-gigahertz band. Use of a sub-gigahertz band, such as a frequency band of about from 800 MHz to 950 MHz, for example, tends to have a greater transmissible distance than that of a communication standard of other frequency bands. The wireless communication standard is not limited to the above, and various other communication standards such as NB-IoT, for example, may be employed. That is, the first frequency band and the second frequency band are not limited to the sub-gigahertz band.

Figure 3:
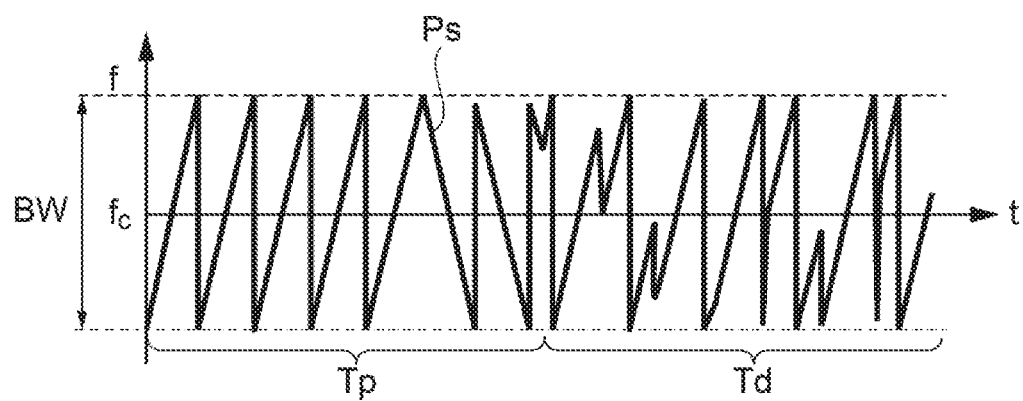
FIG. 3 is a diagram illustrating an example of a time change in a data frequency of a sample signal.

For example, as illustrated in FIG. 3, a time change of a frequency f of data of a sample signal Ps output from a LoRa transmitter is defined at a preamble time Tp and a data time Td. The sample signal Ps is a signal of a wireless communication standard used in the frequency search system 100, and is exemplified as a signal corresponding to each of the first signal P1 and the second signal P2. The preamble time Tp refers to a temporal length of the preamble of the sample signal Ps. The data time Td refers to a temporal length of the data of the sample signal Ps. The data includes, for example, a header including a transmission source and a destination Media Access Control (MAC) address, and a data body. Note that, in FIG. 3, t denotes time, fc denotes a center frequency of the channel, and BW denotes band width.

The first signal P1 and the second signal P2 may be preambles in the wireless communication standard of the frequency search system 100. That is, the first period Ta1 and the second period Ta2 in FIG. 2 may correspond to the preamble time Tp in FIG. 3. However, the first carrier frequency f1 and the second carrier frequency f2 superimposed when the first signal P1 and the second signal P2 are transmitted may differ from each other. For example, in LoRa, the preamble time Tp is generally about 1 ms. In this case, the first period Ta1 and the second period Ta2 may each be about 1 ms.

Figures 4, 5:
FIG. 4 is a table for explaining an example of a position information table.
FIG. 5 is a diagram for explaining an example of an electronic apparatus.

In addition, the first base station 10a and the second base station 10b are each coupled to a position information server 52 via the network 50 and the network server 53. As illustrated in FIG. 4, for example, the position information server 52 stores a position information table. In the position information table, base station information and position information of each base station identified by the base station information are recorded in association. The base station information may be, for example, a MAC address. The base station information may be information specific to the base station that identifies the base station. The position information indicates the position of the base station defined by latitude and longitude. The time server 51, the position information server 52, and the network server 53 may be arranged in each region.

As illustrated in FIG. 1, the electronic apparatus 1 includes a communication I/F 21, a timekeeping circuit 22, a control circuit 23, and a storage device 24. The electronic apparatus 1 may include a time display unit 25, a charge detection circuit 26, a power supply 27 for charging, a secondary battery 28, a battery voltage detection circuit 29, and the like. The electronic apparatus 1 may be a watch worn on an arm of a user by a band 33, for example, as illustrated in FIG. 5. The electronic apparatus 1 may be an analog timepiece that displays the time by pointing to a tick mark on a dial 32 with a hand 31. In this case, the time display unit 25 is provided with, for example, a wheel train, a stepping motor that drives the hand 31 via the wheel train, a driving circuit for driving the stepping motor, and the like.

The communication I/F 21 selectively receives the first signal P1 and the second signal P2. The communication I/F 21 includes an antenna that receives radio waves, and a communication circuit that demodulates and outputs the radio waves received by the antenna to the control circuit 23. The number and types of antennas included in communication I/F 21 may be varied depending on the frequency bands used in the frequency search system 100. The communication I/F 21 may modulate and transmit the signal input from the control circuit 23. The communication I/F 21 complies with the communication standard employed in the frequency search system 100. In other words, the communication I/F 21 may comply with any of LoRaWAN, SIGFOX, NB-IoT, and Wi-Fi HaLow.

The timekeeping circuit 22 divides an oscillation signal generated by a crystal oscillator, and generates a reference signal of 1 Hz, for example. The timekeeping circuit keeps an internal time based on the reference signal. The timekeeping circuit 22 is constituted of, for example, an integrated circuit (IC). The timekeeping circuit 22 includes, for example, a first counter that keeps the UTC, which is the world standard time, a time difference memory that is a non-volatile storage device that stores a time difference relative to the UTC, and a second counter that keeps the local time with the time difference stored in the time difference memory as a difference relative to the UTC. The time difference memory may also serve as the storage device 24.

The control circuit 23 includes a processing circuit such as a CPU, for example. The control circuit 23 constitutes a computer system for processing operations required in a frequency search method by the electronic apparatus 1. The control circuit 23 implements each function described in the exemplary embodiment by, for example, executing programs stored in the storage device 24. The control circuit 23 controls the operation of the communication I/F 21, the timekeeping circuit 22, the storage device 24, and the like. The control circuit 23 may be comprised of integrated hardware or may be comprised of a separate plurality of hardware. The control circuit 23 may also serve as the IC constituting the timekeeping circuit 22.

As illustrated in FIG. 2, the control circuit 23 outputs a reception control signal U to the communication I/F 21, turning on the antenna that receives the radio waves in the communication I/F 21 and the communication circuit that demodulates the radio waves. While the reception control signal U is output, the communication I/F 21 is in a state capable of receiving radio waves by executing radio wave reception processing. In other words, the communication I/F 21 continually executes radio wave reception processing when the reception control signal U is at the high level illustrated in FIG. 2, and does not continuously execute radio wave reception processing when the reception control signal U is at the low level. The control circuit 23 continually causes the communication I/F 21 to execute reception processing during a third period Ta3, and continuously stop the reception processing during a third interval Tb3. The communication I/F 21 cyclically and intermittently executes radio wave reception processing with a sum of the third period Ta3 and the third interval Tb3 as a cycle Tu, in accordance with the control by the control circuit 23.

The control circuit 23 defines the third period Ta3 and the third interval Tb3 at an internal time kept by the timekeeping circuit 22. The internal time may be the UTC kept by the first counter of the timekeeping circuit 22, or may be a local standard time kept by the second counter. The third period Ta3 is defined to include the first period Ta1 and the second period Ta2 in the internal time. Thus, a length of the third period Ta3 is longer than those of the first period Ta1 and the second period Ta2. For example, when the length of the first period Ta1 and the second period Ta2 is 1 ms each, the length of the third period Ta3 may be 5 ms. Further, a start timing of the third period Ta3 is preferably earlier than the start timing of the first period Ta1 and the second period Ta2. Accordingly, when the respective internal times of the electronic apparatus 1, the first base station 10a, and the second base station 10b are aligned with the standard time, the communication I/F 21 receives the first signal P1 during the third period Ta3 when the electronic apparatus 1 is present in the first region R1. On the other hand, when the electronic apparatus 1 is present in the second region R2, the communication I/F 21 receives the second signal P2 during the third period Ta3.

The storage device 24 stores a frequency table 241 and a time zone table 242. The storage device 24 is configured by, for example, a semiconductor memory. The storage device 24 is a computer readable storage medium that stores a series of processing programs and various types of data necessary for operation of the control circuit 23. The storage device 24 is not limited to non-volatile auxiliary storage, and may include a volatile main storage device, such as a register built into the CPU.

As illustrated in FIG. 6, in the frequency table 241, a plurality of regions, the frequency used in each of the plurality of regions, and the regions adjacent to each of the plurality of regions are recorded in association. For example, from FIG. 6, it is understood that region A uses 869.525 MHz and the regions adjacent to A are B, D, J. Similarly, a region B uses 923.3 MHz and the adjacent regions are A, D, J, and a region C uses 786 MHz and the adjacent regions are D, F, H, I, J. The frequencies described in the frequency table 241 may be the initial frequencies in the frequency bands used in each region, for example. Furthermore, as illustrated in FIG. 6, in the frequency table 241, other parameters of the frequencies of the wireless communication used in each of the plurality of regions may be recorded. The parameters may be various parameters defined in each communication protocol, such as bandwidth (BW), spreading factor (SF), and coding rate (CR).

In the present exemplary embodiment, A corresponds to the first region R1 and B adjacent to A corresponds to the second region R2. In other words, the frequency table 241 indicates that the first base station 10a and the second base station 10b are in regions adjacent to each other. Additionally, in the example illustrated in FIG. 6, 869.525 MHz corresponds to the first carrier frequency f1, and 923.3 MHz corresponds to the second carrier frequency f2. That is, the frequency table 241 indicates that the first carrier frequency f1 and the second carrier frequency f2 are respectively used in regions adjacent to each other.

As illustrated in FIG. 7, in the frequency table 242, a plurality of areas, area information that defines each of the plurality of areas, and time difference information for each of the plurality of areas are recorded in association. The area information is recorded, for example, as two latitude and longitude points on a diagonal defining a rectangle having two sides along latitude lines and two sides along longitude lines. The time difference information is a time difference relative to each UTC of the plurality of areas. For example, from FIG. 7, it is understood that an area a is a rectangular area defined by a location 39 degrees north in latitude and 124 degrees east in longitude serving as a northwestern edge, and a location 31 degrees north in latitude and 146 degrees east in longitude serving as the southeastern edge, with a +9 hour time difference relative to the UTC. Similarly, an area b is a rectangular area defined by a location 49 degrees north in latitude and 108 degrees east in longitude, and a location 21 degrees north in latitude and 124 degrees east in longitude, with a +8 hour time difference relative to the UTC. An area c is a rectangular area defined by a location 21 degrees north in latitude and 93 degrees east in longitude, and a location 6 degrees north in latitude and 108 degrees east in longitude, with a +7 hour time difference relative to the UTC. In the time zone table 242, daylight savings time (DST) and the time difference during daylight savings time may be recorded as information associated with each area.

The secondary battery 28 is a battery such as, for example, a rechargeable button battery. The power supply 27 for charging is a power supply that supplies power for charging to the secondary battery 28 to charge the secondary battery 28. The power supply 27 for charging is, for example, a solar cell. The power supply 27 for charging may be a power generator that supplies power to the secondary battery 28 by converting the operation of the electronic apparatus 1 into current by electromagnetic induction. The battery voltage detection circuit 29 detects the voltage of the secondary battery 28 in response to a control signal requesting battery voltage detection input from the control circuit 23. The battery voltage detection circuit 29 outputs a signal indicating the detected voltage to the control circuit 23. The charge detection circuit 26 detects the power supplied to the secondary battery 28 as a charged state in response to a control signal requesting charge detection input from the control circuit 23. The charge detection circuit 26 outputs a signal indicating the detected voltage to the control circuit 23. The secondary battery 28 supplies power to each circuit in the electronic apparatus 1 and drives each circuit.

The electronic apparatus 1 can search for the frequency used in each region using low power consumption and thus, by including the power supply 27 for charging, which generates power, and the secondary battery 28, which stores power, makes it possible to omit regular maintenance such as external charging, battery replacement, and the like.

Operation of Control Circuit

Figure 8:
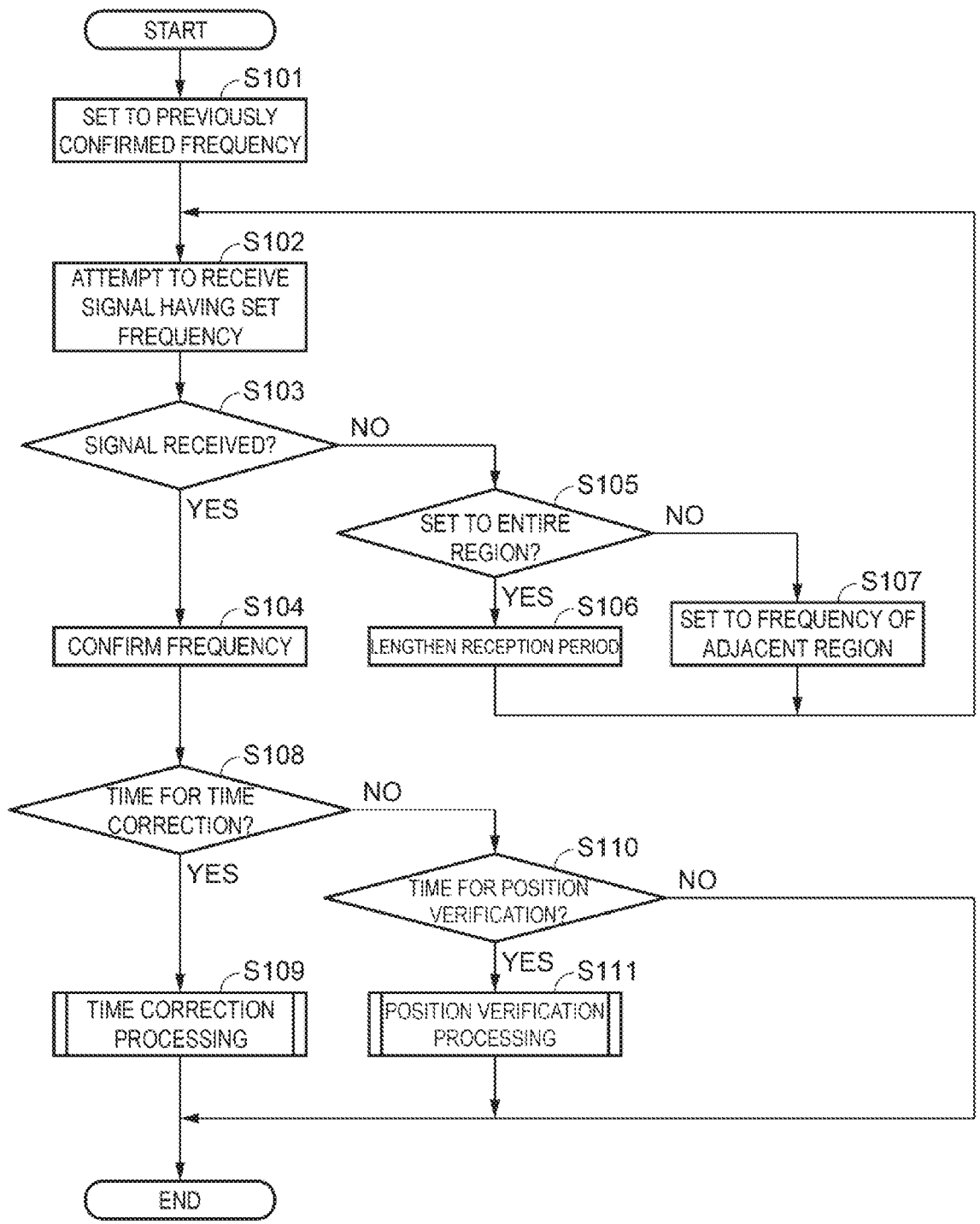
FIG. 8 is a flowchart for explaining an example of a frequency search method by the electronic apparatus according to an exemplary embodiment.

With reference to the flowchart of FIG. 8, operation of the control circuit 23 will be described as an example of a frequency search method of the electronic apparatus 1 according to the present exemplary embodiment. The series of processes illustrated in the flowchart of FIG. 8 is performed, for example, in the third period Ta3 in which the communication I/F 21 executes the reception processing of signals having a specific carrier frequency.

First, in step S101, the control circuit 23 sets the carrier frequency of the signal that causes the communication I/F 21 to perform reception processing to the frequency confirmed in the previous series of processing. In step S101, when there is no previously confirmed frequency, such as when the operation is the initial operation at startup of the control circuit 23, the control circuit 23 may set the carrier frequency of the signal received by the communication I/F 21 to a predetermined initial frequency. The initial frequency may be any of the frequencies recorded in the frequency table 241. The control circuit 23 stores the frequency set after startup in the storage device 24 as history information.

In step S102, the control circuit 23 causes the communication I/F 21 to execute the reception processing of a signal having the set carrier frequency. At this time, as illustrated in FIG. 2, the control circuit 23 outputs the reception control signal U to the communication I/F 21 in the predefined third period Ta3. Accordingly, the control circuit causes the communication I/F 21 to continually perform the reception processing of signals having the set carrier frequency in the third period Ta3. Note that the control circuit 23 causes the communication I/F 21 to continually stop execution of reception processing during the third interval Tb3 following the third period Ta3. The processing of step S102 is performed in each of the cycles Tu.

In step S103, the control circuit 23 determines whether or not a signal having the set carrier frequency was received in the third period Ta3 of step S102. The control circuit 23 advances the processing to step S104 upon determination that a signal was received, and to step S105 upon determination that a signal was not received.

In step S104, the control circuit 23 confirms that the carrier frequency of the signal received by the communication I/F 21 in step S102 is the frequency used in the region where the electronic apparatus 1 is currently present. After confirmation of the frequency, the control circuit 23 advances the processing to step S108.

In step S105, the control circuit 23 refers to the frequency table 241 and the history information of the storage device 24 and, after startup, determines whether or not the carrier frequencies of the signal by which the communication I/F executes reception processing were set to all frequencies recorded in the frequency table 241. In other words, the control circuit 23 determines whether or not the carrier frequencies were set to all frequencies of the regions recorded in the frequency table 241. The control circuit 23 advances the processing to step S106 upon determination that the carrier frequencies were set to all frequencies, and to step S107 upon determination that the carrier frequencies were not all set.

In step S106, the control circuit 23 corrects the reception period, that is, the third period Ta3, in which the communication I/F 21 is caused to execute signal reception processing. For example, when the third period Ta3 was 5 ms in the execution of the previous reception processing, the control circuit 23 corrects the third period Ta3 to 8 ms. This lengthens the time of execution of reception processing by the communication I/F 21 for the signal having the set carrier frequency, which increases the likelihood of signal reception. After correcting the reception period, the control circuit 23 returns the processing to step S102.

In step S107, the control circuit 23 refers to the frequency table 241 and sets the frequency to that of a region adjacent to the region that uses the currently set frequency. For example, assume that, in the first step S101, the first carrier frequency f1 used in the first region R1 is set, and the communication I/F 21 does not receive the first signal P1 having the first carrier frequency f1 in the third period Ta3 of the next step S102. In this case, the control circuit 23 refers to the frequency table 241, and sets the carrier frequency of the signal by which the communication I/F 21 executes the reception processing to the second carrier frequency f2 used in the second region R2 adjacent to the first region R1. The control circuit 23 accumulates and stores the frequencies set after startup in the storage device 24 as history information. After storing the history information, the control circuit 23 returns the processing to step S102.

In step S108, the control circuit 23 determines whether or not it is currently time for time correction. The timing of time correction may be, for example, once daily at a predetermined time, such as, for example, at 3 am daily. The control circuit 23 advances the processing to step S109 to execute time correction processing when it is time for time correction, and advances the processing to step S110 when it is not time for time correction.

In step S110, the control circuit 23 determines whether it is currently time for positioning verification. The timing of positioning verification may be the timing of a predetermined cycle, such as every 15 minutes, for example. For example, a positioning verification cycle may be a natural number of the cycle Tu of execution of signal reception processing by the communication I/F 21. The control circuit 23 advances the processing to step S111 to execute positioning verification processing when it is time for positioning verification, and ends the processing when it is not time for positioning verification.

For example, assume that the first carrier frequency f1 is set as the initial frequency at which the communication I/F executes reception processing, and the communication I/F 21 did not receive the first signal P1 transmitted in the first period Ta1 and having the first carrier frequency f1 in the third period Ta3 starting from a time t1 in FIG. 2. In this case, the control circuit 23 refers to the frequency table 241, specifies the second region R2 adjacent to the first region R1 that uses the first carrier frequency f1, and specifies the second carrier frequency f2 used in the second region R2. The control circuit 23 is configured to cause the communication I/F to execute reception processing of the second signal P2 transmitted in the second period Ta2 temporally not continuous with the first period Ta1 and having the second carrier frequency f2 in the fourth period Ta4 temporally not continuous with the third period Ta3 started from a time t2 in FIG. 2. In other words, the communication I/F 21 executes the reception processing of the second signal P2 following the first signal P1. Here, a length of the fourth period Ta4 is equal to the length of the third period Ta3.

In this way, when the electronic apparatus 1 executes the reception processing of the first signal P1 in the third period Ta3 and does not receive the first signal P1, the electronic apparatus 1 executes the reception processing of the second signal P2 in the fourth period Ta4 not continuous with the third period Ta3. Thus, because the electronic apparatus 1 does not continually consume power for executing signal reception processing, it is possible to reduce the power consumption of the secondary battery 28. Further, the electronic apparatus 1 can increase the likelihood of signal reception by executing signal reception processing for adjacent regions following the signal reception processing for the region in which reception processing was executed. Note that the control circuit 23 may be controlled in a low power consumption mode such as a known sleep mode while communication is not performed between the third period Ta3 and the fourth period Ta4, further reducing power consumption.

Further, while signal reception processing by the communication I/F 21 has been described as being executed in the predetermined cycle Tu in the third period Ta3, the cycle Tu may be changed in accordance with the level of the secondary battery 28 and the charged status by the power supply 27 for charging. For example, the control circuit 23 may obtain a time period during which power is not continuously supplied from the power supply 27 for charging to the secondary battery 28 via the charge detection circuit 26 and, when this time period exceeds a threshold value, extend the cycle Tu. Further, the control circuit 23 may obtain the level of the secondary battery 28 via the battery voltage detection circuit 29 and, when the residual amount is below a threshold value, extend the cycle Tu. As described above, when the level of the secondary battery 28 is expected to be low, the frequency with which the communication I/F 21 executes reception processing is decreased, making it possible to reduce the power consumption of the electronic apparatus 1.

The accuracy of the timekeeping circuit 22 that uses the reference signal based on the crystal oscillator is expressed as a daily difference of, for example, about 0.3 s. In other words, the timekeeping circuit 22 that uses the crystal oscillator has an indication difference of about 1 ms per 5 minutes. Thus, for example, when the first time period Ta1 and the second period Ta2 are each 1 ms and time correction processing is executed every 24, the communication I/F 21 is expected to selectively receive the first signal P1 and the second signal P2 provided that the length of the third period Ta3 is about 5 ms.

Furthermore, the control circuit 23 may extend the third period Ta3 when it is expected that the internal time is not synchronized with the standard time, such as at the initial operation at startup. This may increase the likelihood that, even when the internal time is not synchronized with the standard time, the communication I/F 21 receives a signal from the base station.

Positioning Verification and Time Difference Correction Processing

An example of the positioning verification processing in step S111 of FIG. 8 will be described with reference to the flowchart of FIG. 9. The positioning verification processing confirms the current time difference, that is, time zone, of the area in which the electronic apparatus 1 is present. Note that the timing at which the positioning verification processing is executed may be changed depending on the level of the secondary battery 28, the power consumption of the positioning determination processing, the permissible time from a change in time zone to correction of the internal time, or the like.

First, in step S11, the control circuit 23 verifies the presence of a base station at a frequency determined by the frequency confirmed in step S104 of FIG. 8. In other words, the control circuit 23 transmits, via the communication I/F 21, a verification request signal having a frequency determined from the confirmed frequency as the carrier frequency to the base station. For example, when the electronic apparatus 1 is in the second region R2, the second carrier frequency f2 is confirmed in step S104 of FIG. 8. The communication I/F 21 transmits a verification request signal Q2 having a carrier frequency f4 determined from the second carrier frequency f2 by a protocol in each communication standard to the second base station 10b. In this case, the carrier frequency f4 of the verification request signal Q2 may or may not be the second carrier frequency f2 as long as the carrier frequency is included in the second frequency band. The control circuit 23 verifies the presence of the base station by determining whether or not the communication I/F 21 receives a response signal in response to the verification request signal within a predetermined time from transmission of the verification request signal.

Here, when a verification request signal is received from the electronic apparatus 1, a base station such as the second base station 10b returns a response signal including time information and position information to the electronic apparatus 1. For example, in response to receiving the verification request signal Q2, the second base station 10b obtains the time information from the time server 51 and the position information from the position information server 52, via the network server 53. Specifically, the second network I/F 15b of the second base station 10b transmits a query to the time server 51. The time server 51 returns the time information in response to the query. Further, the second network I/F 15b of the second base station 10b transmits a query to the position information server 52. The position information server 52 identifies position information related to the base station information included in the transmitted query from the position information table, and returns a signal including the position information to the base station. The second base station 10b generates a response signal including the obtained time information and position information to the electronic apparatus 1.

In step S12, the control circuit 23 advances the processing to step S13 when a base station is present, and ends the processing when a base station is not present, according to the result of verification of the presence of a base station in step S11.

In step S13, the control circuit 23 obtains base station information, such as a MAC address, for example, included in the response signal received in step S11. The control circuit 23 causes the storage device 24 to cyclically store at least the two sets of base station information most recently obtained.

In step S14, the control circuit 23 refers to the base station information stored in the storage device 24, and determines whether the base station information obtained in step S13 has changed from the previous information. The control circuit 23 advances the processing to step S15 when the base station information has changed, and ends the processing when the base station information has not changed.

In step S15, the control circuit 23 obtains the position information included in the response signal received in step S11.

In step S16, the control circuit 23 obtains the time difference information identified from the position information of the base station obtained in step S15, with reference to the time zone table 242. Specifically, the control circuit 23 identifies an area including the position of the base station indicated by the latitude and longitude of the position information in the time zone table 242, and obtains the time difference information associated with the identified area as a time difference of the region in which the base station is positioned. For example, when the position information obtained in step S15 is 35.68 degrees north and 139.78 degrees east in FIG. 4, the base station positioned at this location is identified as being positioned in the area a in FIG. 7A, and thus the control circuit 23 acquires "+9" as the time difference information associated with the area a. The control circuit 23 causes the storage device 24 to cyclically store at least the two sets of time difference information most recently obtained.

In step S17, the control circuit 23 refers to the time difference information stored in the storage device 24, and determines whether the time difference information obtained in step S16 has changed from the previous information. The control circuit 23 advances the processing to step S18 when the time difference information has changed, and ends the processing when the time difference information has not changed.

In step S18, the control circuit 23 updates the time difference set in the timekeeping circuit 22 to the time difference indicated by the time difference information obtained in step S16. In other words, the time difference information stored in the time difference memory in the timekeeping circuit is updated to the time difference indicated by the time difference information obtained in step S16. In this way, the timekeeping circuit 22 corrects the local standard time kept by the second counter. In response, the control circuit 23 changes the time displayed by the time display unit 25 to the corrected local standard time, and ends the processing.

Note that when the first base station 10a and the second base station 10b each store their own position information, the electronic apparatus 1 may, for example, transmit the position request signal to the second base station 10b, and receive a response signal including position information from the second base station 10b. At this time, the communication I/F 21 transmits a position request signal having a carrier frequency determined from the second carrier frequency f2 to the second base station 10b. In this case, the carrier frequency of the position request signal may or may not be the second carrier frequency f2, as long as the carrier frequency is included in the second frequency band.

Time Correction Processing

Figure 10:
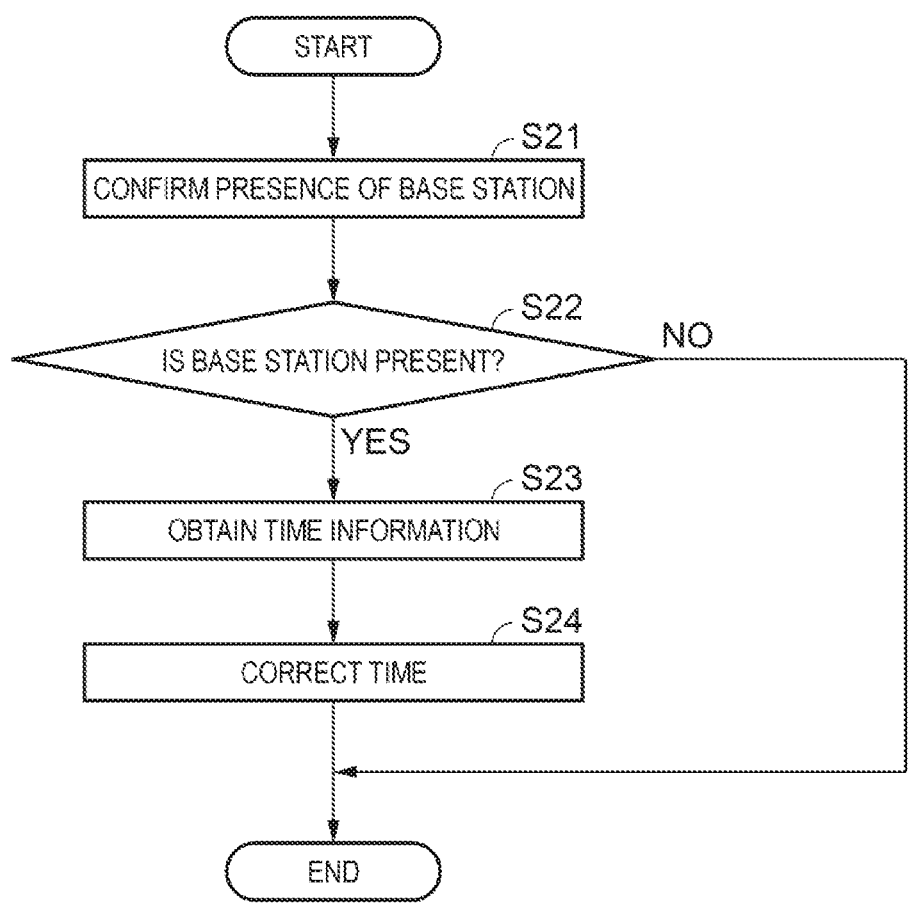
FIG. 10 is a flowchart for explaining an example of time correction processing in FIG. 8.

An example of the time correction processing in step S109 of FIG. 8 will be described with reference to the flowchart of FIG. 10.

Figure 9:
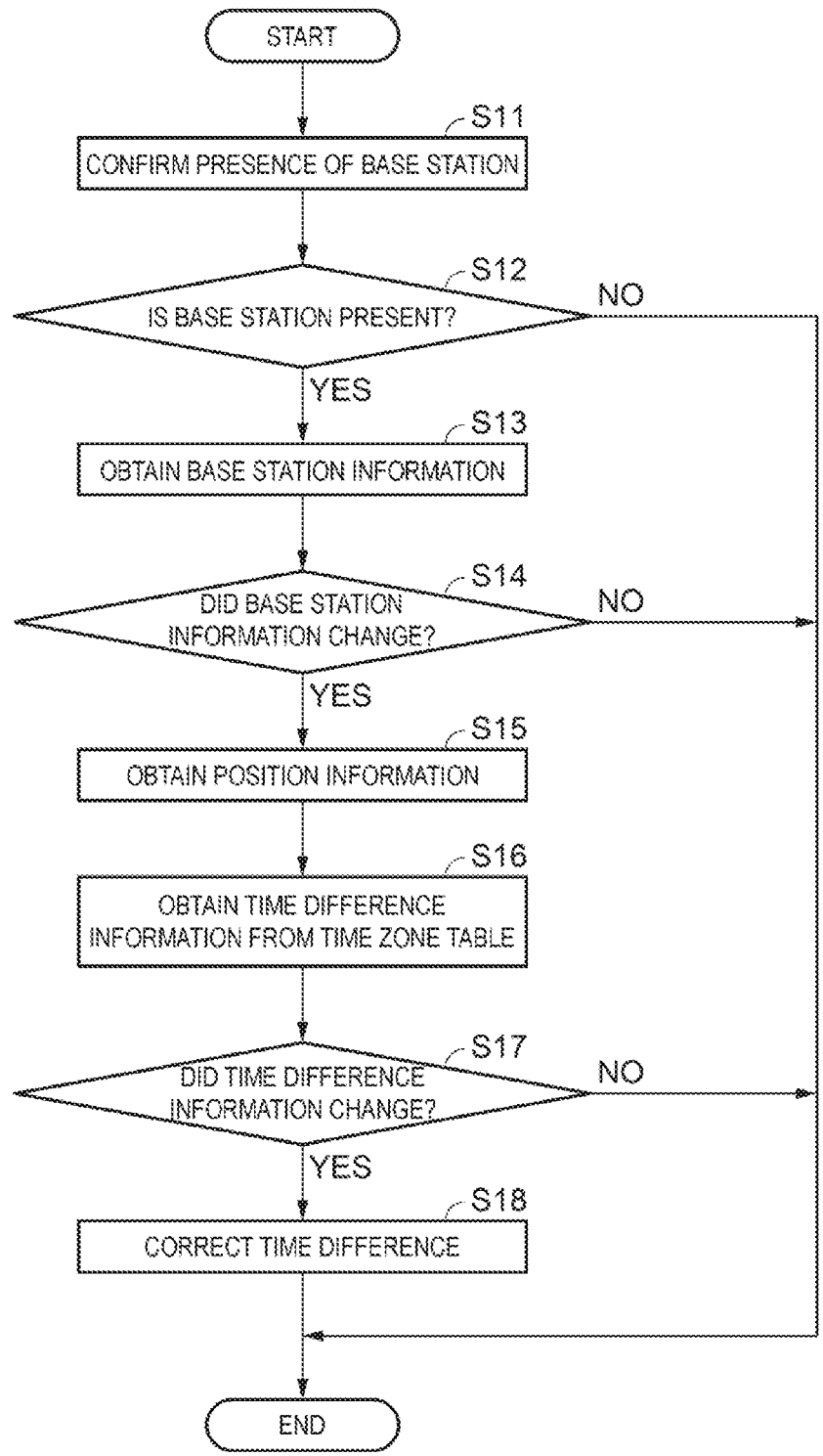
FIG. 9 is a flowchart for explaining an example of positioning verification processing in FIG. 8.

First, in step S21, the control circuit 23 verifies the presence of a base station at a frequency determined by the frequency confirmed in step S104 of FIG. 8, similar to step S11 of FIG. 9. In other words, the control circuit 23 transmits, via the communication I/F 21, a verification request signal having a frequency determined from the confirmed frequency as the carrier frequency to the base station. The communication I/F 21 transmits a verification request signal having a carrier frequency determined from the confirmed frequency to the base station according to the protocol of each communication standard. The control circuit 23 verifies the presence of the base station by determining whether or not the communication I/F receives a response signal in response to the verification request signal within a predetermined time from transmission of the verification request signal.

In step S22, the control circuit 23 advances the processing to step S13 when a base station is present, and ends the processing when a base station is not present, according to the result of verification of the presence of a base station in step S21.

In step S23, the control circuit 23 obtains the time information included in the response signal received in step S21. The control circuit 23 may convert the time information into UTC when the type of time information to be obtained is local standard time, not UTC.

In step S24, the control circuit 23 corrects the time kept by the first counter of the timekeeping circuit 22 to the UTC obtained in step S23. In this way, the timekeeping circuit 22 updates the local standard time kept by the second counter to the time calculated by adding the time difference stored in the time difference memory to the UTC kept by the first counter. In response, the control circuit 23 changes the time displayed by the time display unit 25 to the corrected local standard time, and ends the processing.

In other words, when the first signal P1 is received during the third period Ta3, the communication I/F 21 transmits a first request signal Q1 (refer to FIG. 2) having a third carrier frequency f3 determined from the first carrier frequency f1 to the first base station 10a. When the communication I/F 21 receives, from the first base station 10a, first time information indicating a first time in response to the first request signal Q1, the control circuit 23 corrects the internal time kept by the timekeeping circuit 22 to the first time included in the first time information. On the other hand, when the second signal P2 is received during the fourth period Ta4, the communication I/F 21 transmits the second request signal Q2 having the fourth carrier frequency f4 determined from the second carrier frequency f2 to the second base station 10b. When the communication I/F 21 receives, from the second base station 10b, second time information indicating a second time in response to the second request signal Q2, the control circuit 23 corrects the internal time kept by the timekeeping circuit 22 to the second time included in the second time information. The third carrier frequency f3 may be the first carrier frequency f1, and the fourth carrier frequency f4 may be the second carrier frequency f2.

As described above, after verification of the frequency used in the region, the electronic apparatus 1 transmits a request signal from the region in which it is present. Thus, the electronic apparatus 1 can reduce the possibility of the transmission of radio waves at frequencies not standardized for use in the region. Further, the electronic apparatus 1 automatically performs time correction and time difference correction at a predetermined cycle, and thus can follow the local time even when moved around the world. Further, the electronic apparatus 1 can reduce power consumption, making it possible to employ a configuration that uses a solar cell. As a result, the load caused by maintenance such as time correction, time difference correction, and battery replacement can be reduced.

OTHER EXEMPLARY EMBODIMENTS

Although the foregoing descriptions have been provided for exemplary embodiments of the present disclosure, these shall not be construed as limiting the present disclosure. The configuration of each component may be substituted for any configuration having similar functionality, and any component may be omitted or added within the technical scope of the present disclosure. Various alternative exemplary embodiments will thus be apparent from this disclosure to those skilled in the art.

For example, whether or not a signal has been received in step S103 of FIG. 8 may be determined by whether an electric field strength of the received signal exceeds a predetermined threshold. In this case, after the processing of steps S107 and S102 is repeated following a predetermined pattern, it may be determined that the signal having the largest electric field strength in the history information stored in the storage device 24 has been received.

In addition, it goes without saying that the present disclosure includes various exemplary embodiments not described above, such as configurations in which the configurations described above are applied to one another. Furthermore, it is a matter of course that the present disclosure includes various exemplary embodiments which have not been described herein, such as configurations and the like resulting from application of the exemplary embodiments described above to one another. The technical scope of the present disclosure shall be determined only based on the matter to define the disclosure relating to the scope of claims, which is judged as appropriate from the foregoing descriptions.

According to the electronic apparatus according to the exemplary embodiment described above, in an electronic apparatus capable of receiving signals of different frequencies, the power consumption of a frequency search can be reduced by setting the timing at which the electronic apparatus receives signals to include the timing at which the first transmitter or the second transmitter transmits signals. As a result, even in a small electronic apparatus having a constrained configuration such as a watch, the possibility of excessive power consumption can be reduced.

Further, according to the electronic apparatus, because the frequency table records frequencies used in regions adjacent to each other, the electronic apparatus can execute reception processing from frequencies of regions to which the electronic apparatus most likely has been moved. This makes it possible to reduce the time of a frequency search.

Further, the electronic apparatus can lengthen the third period as an initial operation at startup, and thus increase the likelihood that the communication interface will receive the first signal even in an initial state in which the internal time is likely to be deviated from the standard time in which the first period and the second period are defined.

Further, according to the electronic apparatus, when the level of the secondary battery is expected to be low, such as when the duration of not supplying power to the secondary battery from the power supply for charging exceeds a threshold value, the duration of executing signal reception processing can be shortened and power consumption can be reduced.

Further, when the electronic apparatus includes a communication interface in compliance with a standard included in a communication standard group called LPWA, the communication distance tends to be extendable at a lower power consumption compared to other communication standards.

Further, when the electronic apparatus communicates with carrier frequencies within the range of the sub-gigahertz band, the electronic apparatus tends to have favorable diffraction characteristics and a long transmission distance compared to those of communication standards of other frequency bands.

Further, when the electronic apparatus, after searching for frequencies used in the current location, transmits a request signal having a third carrier frequency and a fourth carrier frequency determined in accordance with standards, it is possible to suppress transmission of radio waves of frequencies not standardized for use in the current location.

Further, after searching for frequencies using low power consumption, the electronic apparatus can obtain time information and correct the internal time by transmitting a request signal at an appropriate frequency for the region. Thus, it is possible to reduce the power consumption for time correction by transmitting a request signal.

What is claimed is:

1. An electronic apparatus comprising:
    a communication interface configured to selectively receive a first signal having a first carrier frequency transmitted, for a first period, by a first transmitter, and a second signal having a second carrier frequency different from the first carrier frequency and transmitted, for a second period not continuous with the first period, by a second transmitter different from the first transmitter;
    a timekeeping circuit configured to keep an internal time; and
    a control circuit configured to cause the communication interface to execute reception processing of the first signal for a third period, including the first period in the internal time, and to, when the communication interface does not receive the first signal during the third period, cause the communication interface to execute reception processing of the second signal for a fourth period, including the second period and being not continuous with the third period, of the internal time.

2. The electronic apparatus according to claim 1, further comprising:
    a storage device configured to store a frequency table indicating that the first carrier frequency and the second carrier frequency are respectively used in regions adjacent to each other, wherein
    the control circuit is configured to cause the communication interface to execute reception processing of the second signal following the first signal with reference to the frequency table.

3. The electronic apparatus according to claim 1, wherein the control circuit is configured to, at startup, extend the third period as an initial operation.

4. The electronic apparatus according to claim 1, further comprising:
    a secondary battery; and
    a power supply for charging configured to supply power to the secondary battery, wherein
    the control circuit is configured to cause the communication interface to execute reception processing of the first signal in a predetermined cycle, and to extend the predetermined cycle when a duration time, in which power is not supplied from the power supply for charging to the secondary battery, exceeds a threshold value.

5. The electronic apparatus according to claim 1, wherein the communication interface complies with any one of LoRaWAN, SIGFOX, NB-IoT, and Wi-Fi HaLow.

6. The electronic apparatus according to claim 1, wherein each of the first carrier frequency and the second carrier frequency is within a range of a sub-gigahertz band.

7. The electronic apparatus according to claim 1, wherein the communication interface is configured to transmit, when the communication interface receives the first signal during the third period, a first request signal having a third carrier frequency determined from the first carrier frequency to the first transmitter and transmit, when the communication interface receives the second signal during the fourth period, a second request signal having a fourth carrier frequency determined from the second carrier frequency to the second transmitter.

8. The electronic apparatus according to claim 7, wherein the control circuit is configured to, when the communication interface receives first time information as a response to the first request signal, correct the internal time based on the first time information, and to, when the communication interface receives second time information as a response to the second request signal, correct the internal time based on the second time information.

* * * * *